United States Patent [19]

Fukuoka et al.

[11] Patent Number: 4,571,813

[45] Date of Patent: Feb. 25, 1986

[54] AUTOMATIC TOOL CHANGING APPARATUS FOR MULTI-SPINDLE MACHINE TOOL

[75] Inventors: Masayuki Fukuoka; Satoshi Matsumoto, both of Fuchu, Japan

[73] Assignee: Sakazaki Machinery Works Co., Ltd., Tokyo, Japan

[21] Appl. No.: 524,979

[22] Filed: Aug. 22, 1983

[30] Foreign Application Priority Data

Jun. 9, 1983 [JP] Japan ................................ 58-103218

[51] Int. Cl.⁴ ............................................ B23Q 3/157
[52] U.S. Cl. ........................................ 29/568; 414/736
[58] Field of Search ............... 29/568, 26 A, 426.3; 414/736

[56] References Cited

U.S. PATENT DOCUMENTS

| | | | |
|---|---|---|---|
| 3,566,516 | 3/1971 | Brainard et al. | 29/568 |
| 3,571,912 | 3/1971 | Kielma | 29/568 |
| 3,646,664 | 3/1972 | Vearil et al. | 29/568 |
| 4,221,043 | 9/1980 | Dailey | 29/568 |
| 4,443,928 | 4/1984 | Kielma | 29/568 |

FOREIGN PATENT DOCUMENTS 47-14870  4/1972  Japan .................................. 29/568

*Primary Examiner*—Z. R. Bilinsky
*Attorney, Agent, or Firm*—Lackenbach Siegel Marzullo Presta & Aronson

[57] ABSTRACT

An automatic tools changing method and apparatus for a multi-spindle machine tool, in which a tools changing operation between spindles and a tool magazine or magazines is carried out simultaneously through at least one tool-changing arm movable between the spindles and the tool magazine or magazines. For this reason, the spindles are arranged at predetermined intervals and pots of the tool magazine or magazines for storing tools and grasping members on the tool-changing arm or arms are arranged at positions corresponding to the positions of the spindles to receive or deliver the tools simultaneously.

7 Claims, 5 Drawing Figures

AUTOMATIC TOOL CHANGING APPARATUS FOR MULTI-SPINDLE MACHINE TOOL

BACKGROUND OF THE INVENTION

1. Field of the Invention

This invention relates to an automatic tools changing apparatus for a vertical type multi-spindle machine tool, with four or more spindles, which is capable of changing tools for plural spindles simultaneously.

2. Description of Prior Art

Heretofore, there have been proposed various effective automatic tools changing methods and apparatuses for single-spindle machine tools which are capable of carrying out an automatic tools changing operation easily and effectively, because tools may be changed one by one in such single-spindle machine tools.

However, there have not yet been known effective methods and apparatuses for carrying out an automatic tools changing operation for vertical type multi-spindle machine tools with four or more spindles. Therefore, an automatic tools changing operation for a multi-spindle tool is carried out in such a manner that a plurality of automatic tools changing apparatuses for a single-spindle machine tool are employed for the respective spindles of the multi-spindle machine tools or a tool magazine adapted to move for carrying out the tool changing between the tool magazine and spindles without using a tool-changing arm is employed when the number of the tools is as small as two or three.

However, the former method in which a plurality of automatic tools changing apparatuses for a single-spindle machine tool are provided has such a disadvantage that it is difficult to mount more than two tools changing apparatuses on one tool machine due to problems of a mounting space and interference caused between the apparatuses and it cannot be expected to significantly reduce a time required for a tools changing operation. The latter method in which tools are changed between the spindles and the tool magazine has such a disadvantage that the arrangement of the machine tool is highly restricted by the tool magazine which should be moved relative to the spindles and it is difficult to be applied to a machine tool having four or more spindles.

OBJECTS OF THE INVENTION

It is therefore an object of the present invention to provide an automatic tools changing apparatus for a vertical type multi-spindle machine tool with four or more spindles which tool change for all the spindles is accomplished by only two driving means each for making a vertical motion and a horizontal relation of the tool changing arms.

It is another object of the present invention to provide an automatic tools changing apparatus for a vertical type multi-spindle machine tool with four or more spindles which the driving means for the arms have a simple mechanism, which achieves a reduction of failure and minimizes maintenance of the apparatus.

It is still another object of the present invention to provide only two tool changing arms which are required notwithstanding the number of the spindles to present a multi-spindle machine tool having a simplified mechanism.

SUMMARY OF THE INVENTION

In accordance with the present invention, there is provided an automatic tools changing method for a multi-spindle machine tool, using a machining center comprising a head stock with two or more spindles disposed so as to have a predetermined positional relationship therebetween and at least one tool magazine having pots disposed so as to have a positional relationship therebetween corresponding to the positional relationship of said spindles, which method comprises: a step of grasping used tools which are fitted on the respective spindles simultaneously to remove them from said respective spindles by grasping members which are provided on at least one tool-changing arm and disposed keeping a positional relationship therebetween corresponding to that of the spindles; a step of rotating said tool-changing arm to a position for carrying out tool changing between said tool magazine and said tool-changing arm to return said used tools simultaneously to empty pots of the tool magazine; a step of moving said tool magazine until new tools to be fitted onto the spindles come to positions where tool delivery to the tool-changing arm can be carried out; a step of grasping said new tools simultaneously by said grasping members of the tool-changing arm to remove them from the pots where they have been stored; and a step of rotating said tool-changing arm to the spindles to simultaneously set said new tools to the spindles, respectively.

DESCRIPTION OF PREFERRED EMBODIMENT

Figure 1:
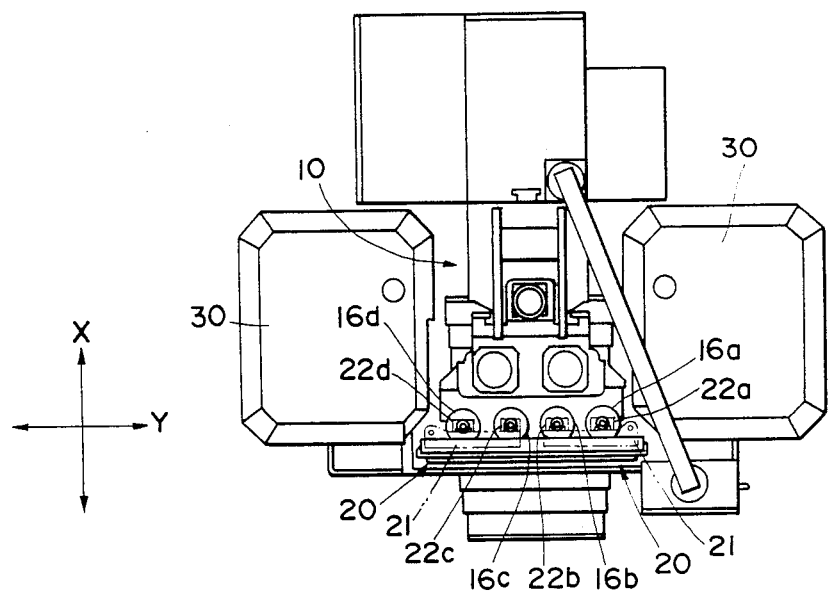
FIG. 1 is a plan view of one form of a multi-spindle machine tool with four spindles for carrying out the present invention.
Figure 2:
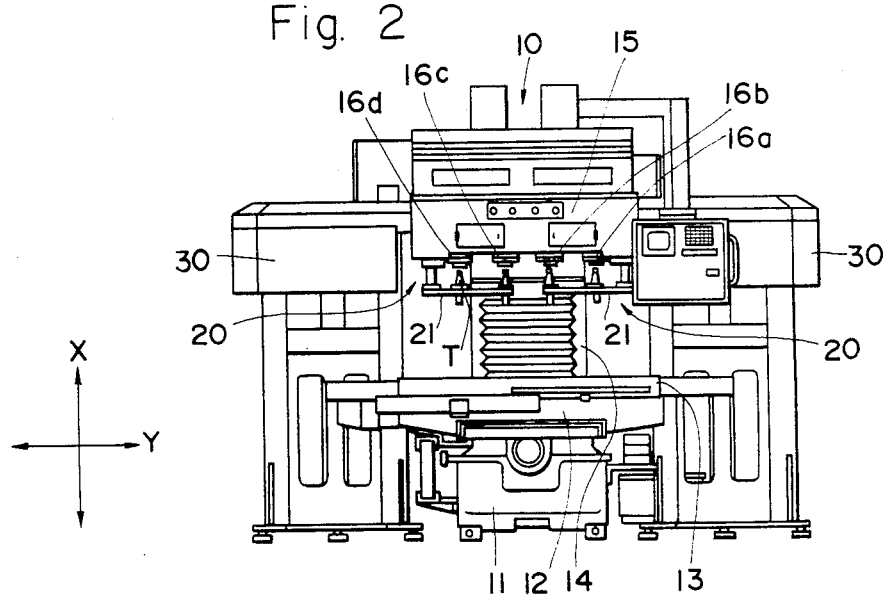
FIG. 2 is a front view of the multi-spindle machine tool illustrated in FIG. 1.

In FIGS. 1 and 2, 10 designates a body of the machine tool, 20 designates a tools changing apparatus and 30 designates a tool magazine.

In this embodiment, a milling machine is employed as the body 10 of the machine tool which comprises a saddle 12 which is adapted to slide in a Y-axis direction on a bed 11, a table 13 which is slidable in an X-axis direction on the saddle 12, a head stock 15 which is positioned in front of a column 14 and adapted to be moved up and down in a Z-axis direction, and four spindles 16 (16a, 16b, 16c and 16d) provided under the head stock 15 and disposed at equal intervals in the X-axis direction.

Figure 3:
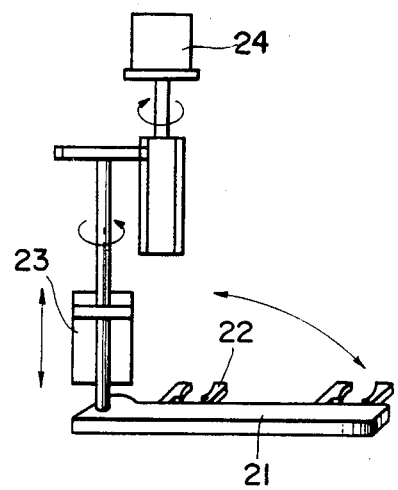
FIG. 3 is a schematic view of one form of an automatic tools changing apparatus provided on the multi-spindle machine tool for carrying out the present invention.

The tools changing apparatus 20 is provided at outer side portions of the lower portion of the head stock 15 and comprises tool-changing arms 21 which is formed straight and is able to move up and down and also is able to rotate horizontally, grasping members 22 (22a, 22b or 22c, 22d) which are disposed linearly on each inner side of the tool-changing arms 21, keeping the same interval as that of the spindles 16 and adapted to be operated so as to close or open by a first driving means (not illustrated), second driving means 23 for driving the tool-changing arms 21 as illustrated in FIG. 3, and third driving means 24 for rotating the tool-changing arms 21 by 90° is also illustrated in FIG. 3. The first driving means is provided within each of the tool-changing arms 21 and the second and third driving means 23 and 24 are provided within the head stock 15. These driving means may be substantially the same as those usually used for conventional automatic tools changing apparatuses for single-spindle machine tools. For example, the grasping members 22 may be operated, by a pneumatic cylinder, to close for holding a tool therein or open to release the tool therefrom.

In the arrangement as described above, when the tool-changing arm 21 of the right tools changing apparatus 20 as viewed in FIGS. 1 and 2 is located at a position under the head stock 15 where tool changing is carried out between the spindles 16a, 16b and the right tool-changing arm 21, the centers of the respective grasping members 22a, 22b coincide with the centers of the respective spindles 16a, 16b. Similarly, when the tool-changing arm 21 of the left tools changing apparatus 20 is located at a position under the head stock 15 where tool changing is carried out between the spindles 16c, 16d and the left arm 21, the center of the grasping members 22c, 22d become coaxial with the spindles 16c, 16d, respectively. The first to third driving means for the right and left tools changing apparatuses 20 are adapted to be operated by the signals common to the right and left apparatuses 20, so that the right and left tools changing apparatuses 20 are operated in synchronism with each other.

The tool magazines 30 are disposed on the opposite sides of the body 10 of the machine tool and provided with a plurality of pots 31 for holding tools T therein. The pots 31 are disposed serially on each of the tool magazines 30. The pots 31 have predetermined positional relationships with the intervals between the spindles 16. More specifically, the interval between the spindles 16 is a multiple of the space between the pots 31. In the embodiment as illustrated, the interval between the spindles 16 is double of the interval between the pots 31. The pots 31 are provided on a known drum or chain of the tool magazine 30 and disposed at positions divided so as to be locatable at positions for changing tools between the magazine 30 and the tool-changing arm 21. When the pots 31 are located at such tool-changing positions or accessible positions, the centers of the two pots 31 which are positioned after or before the preceding or succeeding one coincide respectively with the centers of the grasping members 22 of the tool-changing arm 21 which has been rotated by 90° from the position under the head stock 15. In the illustrated embodiment, a pair of tools $T_1$, $T_1$–$T_{20}$, $T_{20}$, each pair representing the same kind of tools, are stored in pots 31 skipping over the pot intermediate between the pots 31. With this arrangement, the spacings between the pots 31 on the chain or drum can be reduced than the space between the grasping members 22 on the tool-changing arm 21, so that the number of the tools which can be stored in the tool magazine 30 can be increased as much.

Figure 5:
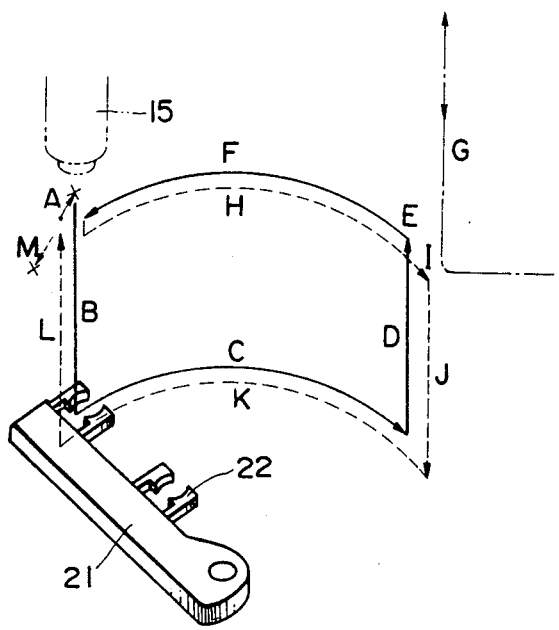
FIG. 5 is an explanatory view showing the operating sequence of a tool-changing arm.
Figure 4:
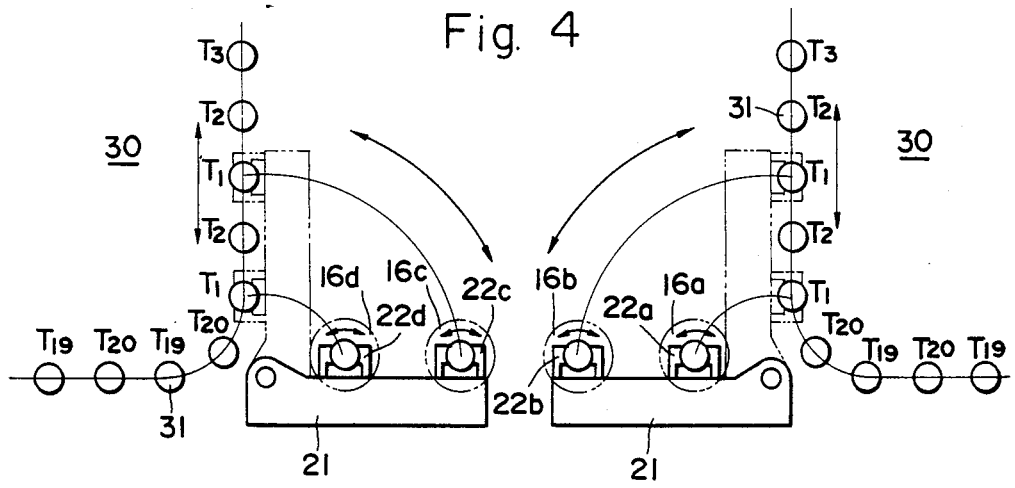
FIG. 4 is an explanatory plan view showing the positional relationship between spindles and tool magazines.

The operation of the tools changing apparatus will now be described referring to FIGS. 4 and 5.

During the machining operation, the tool-changing arm 21 is in a standby position under the head stock 15 where it does not interfere with the rotation of the spindles, while keeping the grasping members 22 opened and the centers of the respective grasping members 22 coaxial with the centers of the respective spindles 16. When the machining operation has been completed, the grasping members 22a, 22b and 22c, 22d are closed simultaneously to grasp the tools, for example, $T_1$ fitted on the spindles 16a, 16b, 16c and 16d (FIG. 5, A). Tool locks (not illustrated) provided within the respective spindles are then released and the right and left tool-changing arms 21 are lowered to pull or remove the used tools $T_1$ out of the spindles (FIG. 5, B). The tool-changing arms 21 are rotated simultaneously by 90° to the positions where tool changing is carried out between the arms 21 and the corresponding tool magazines 30 (FIG. 5, C) and then moved upwardly to return the used tools $T_1$ simultaneously to empty pots 31 of the tool magazines 30 which have been preliminarily located at the positions for changing tools between the pots and the grasping members (FIG. 5, D). When the used tools $T_1$ are received in the pots 31, the grasping members 22a, 22b and 22c, 22d are opened (FIG. 5, E) and the tool-changing arms 21 are rotated horizontally to the spindles 16 to retreat from the positions adjacent to the respective tool magazines 30 so as not to interfere with an operation for indexing pots holding tools to be newly used (FIG. 5, F). When the tool-changing arm 21 has been retreated, the tool magazine 30 indexes new tools, i.e., another kind of tools, for example, $T_{19}$ to the tool-changing positions (FIG. 5, G). After the indexing operation, the tool-changing arms 21 are again rotated from the retreated positions to the positions for changing tools with the tool magazines 30 (FIG. 5, H) and the grasping members 22 are closed to hold the tools $T_{19}$ (FIG. 5, I). The tool-changing arm 21 holding the tools $T_{19}$ thereon are lowered to pull or remove the tools $T_{19}$ from the pots 31 simultaneously (FIG. 5, J), rotated by 90° to the spindles 16 (FIG. 5, K) and then moved upwardly to fit the tools $T_{19}$ onto the spindles 16a, 16b, 16c and 16d (FIG. 5, L) simultaneously. The tools $T_{19}$ are then locked within the respective spindles 16a, 16b, 16c and 16d and the grasping members 22a, 22b and 22c, 22d are opened to complete the tool changing operation (FIG. 5, M).

Thus, the automatic tools changing apparatus of the invention can carry out and change tools for the four or more spindles simultaneously by simultaneously operating the two tool-changing arms which are formed straight and each having grasping members disposed linearly at the inner side of said tool-changing arms which number is half of the number of spindles of a machine tool. The tools changing operation is effected by a simple operation of the tool-changing arm, i.e., two sets of the tool-changing arm are operated simultaneously, and all tools provided with four or more spindles are changed at the same time. In this operation, the tool-changing arm rotates by 90° between the spindles and the tool magazine and moves the arm up and down.

If the number of the spindles is six larger than four, for example, each of the tool-changing arms is provided with three grasping members. If the masculine number of the spindles, i.e., five or seven, is provided, one tool-changing three or two grasping members will suffice. Thus, the number or structure of the tool-changing arms, tool magazines or grasping members may be suitably adapted to the number of the spindles of the tool machine.

The embodiment of the invention particularly disclosed and described hereinabove is presented merely as an example of the invention. Other embodiments, forms, and modifications of the invention coming within the proper scope and spirit of the claims will, of course, readily suggest themselves to those skilled in the art.

We claim:

1. An automatic tool changing apparatus for a vertical type multi-spindle machine tool, having a head stock on which is disposed four or more spindles linearly having equal intervals with respect to each other at the lower portion of said head stock which is provided with an outer side, and comprising:

a plurality of tool-changing arms having inner sides, each arm of which is provided with a straight form, and the respective arms are disposed in vertically and horizontally movable directions at the outer side of said lower portion of said head stock; grasping members disposed linearly on each inner side of said tool-changing arms and having a spacing equal to that of said spindles, and the number of said grasping members being half that of the number of said spindles;

tool magazines being provided adjacent to both sides of said head stock and each said tool magazine having a plurality of tool pots;

a first driving means provided on said head stock to rotate said tool-changing arms in a horizontal direction by 90° from said lower portion of said head stock to positions where tool changing is carried out between said arms and the corresponding tool magazines; and a second driving means provided on said head stock to move said tool-changing arms in a vertical direction.

2. The automatic tool changing apparatus for a vertical type multi-spindle machine tool according to claim 1, wherein said tool changing arms, and the plurality of grasping members which are disposed on said tool changing arms, and said tool magazines are moved synchronously with respect to each other.

3. The automatic tool changing apparatus for a vertical type multi-spindle machine tool according to claim 1, wherein the spacing between two adjoining pots of a tool magazine along their transfer direction is half of the spacing of said grasping members of said tool changing arms.

4. The automatic tool changing apparatus for a vertical type multi-spindle machine tool according to claim 1, wherein the interval between said spindles is a multiple of the space between said pots.

5. The automatic tool changing apparatus for a vertical type multi-spindle machine tool according to claim 1, wherein a reduction in the spacing between said tool pots proportionally increases the number of tools which can be stored in said tool magazines.

6. The automatic tool changing apparatus for a vertical type multi-spindle machine tool according to claim 1, wherein the number of tool-changing arms is two; and the number of tool magazines is two.

7. The automatic tool changing apparatus for a vertical type multi-spindle machine tool according to claim 1, including further driving means for opening and closing said spindles.

* * * * *